United States Patent
Parsons et al.

[11] Patent Number: 5,848,481
[45] Date of Patent: Dec. 15, 1998

[54] COMBINATION SQUARE AND TAPE MEASURE FOR USE WITH A TOOL BELT

[76] Inventors: Don Parsons; Joan E. Parsons, both of P.O. Box 810, Darby, Mont. 59829

[21] Appl. No.: 826,105

[22] Filed: Mar. 24, 1997

[51] Int. Cl.[6] ............................. B43L 7/027; G01B 3/10
[52] U.S. Cl. ............................. 33/760; 33/42; 33/474; 33/484; 33/770
[58] Field of Search ................. 33/760, 42, 429, 33/448, 474, 478, 480, 484, 485, 491, 759, 768, 770

[56] References Cited

U.S. PATENT DOCUMENTS

| | | |
|---|---|---|
| D. 276,316 | 11/1984 | Weeks . |
| D. 299,437 | 1/1989 | Kull . |
| D. 333,627 | 3/1993 | Douglas . |
| 1,257,683 | 2/1918 | Defenbaugh ............................. 33/42 |
| 2,563,674 | 8/1951 | Coots . |
| 2,571,569 | 10/1951 | Greenwood . |
| 3,390,461 | 7/1968 | Anderson . |
| 3,651,574 | 3/1972 | Burkart . |
| 3,823,481 | 7/1974 | Chapin . |
| 4,128,030 | 12/1978 | Kundikoff ............................. 33/429 |
| 4,200,984 | 5/1980 | Fink . |
| 4,227,314 | 10/1980 | Schliep . |
| 4,642,898 | 2/1987 | Miller ............................. 33/768 |
| 4,835,870 | 6/1989 | Rauch et al. . |
| 4,965,944 | 10/1990 | Kuze et al. ............................. 33/760 |
| 4,967,482 | 11/1990 | Hoover et al. ............................. 33/484 |
| 5,113,596 | 5/1992 | Meyers . |
| 5,388,337 | 2/1995 | Powers, II ............................. 33/760 |
| 5,390,425 | 2/1995 | Gilberts ............................. 33/760 |
| 5,390,426 | 2/1995 | Hull ............................. 33/720 |
| 5,456,015 | 10/1995 | Butcher et al. . |
| 5,481,810 | 1/1996 | Hastings et al. . |

*Primary Examiner*—Christopher W. Fulton
*Attorney, Agent, or Firm*—Jerry Johnson

[57] ABSTRACT

A combination square and tape measure comprises a square having first and second legs arranged perpendicular to each other and a tape measure including a housing encasing a flexible measuring tape. A mounting structure attaches the tape measure to one leg of the square. The mounting structure supports the tape measure for pivotable movement about the square; wherein the tape measure may be rotated about the square from at least a reclined position where a plane bisecting the housing of the tape measure is parallel to the plane of the square to a fully inclined upright position where the plane bisecting the tape measure is orthogonal the plane of the square. The mounting structure maintains the outer surface of the tape measure at an elevated spaced apart position relative to the plane of the square when the tape measure is maintained in the reclined position. The gap created by the spaced apart position provides room for the thick material utilized for the pouches of a tool belt to be disposed between the tape measure and the square. This allows either the tape measure or square to be retained properly with a tool belt while allowing both the tape measure and the square to hang from tool belt in an out of the way vertical orientation. The combination square and tape measure of the present invention further typically includes a plurality of marking instrument receiving indentations disposed along at least one edge of the second leg, wherein the marking instrument receiving indentations are disposed at specific measurement intervals.

10 Claims, 5 Drawing Sheets

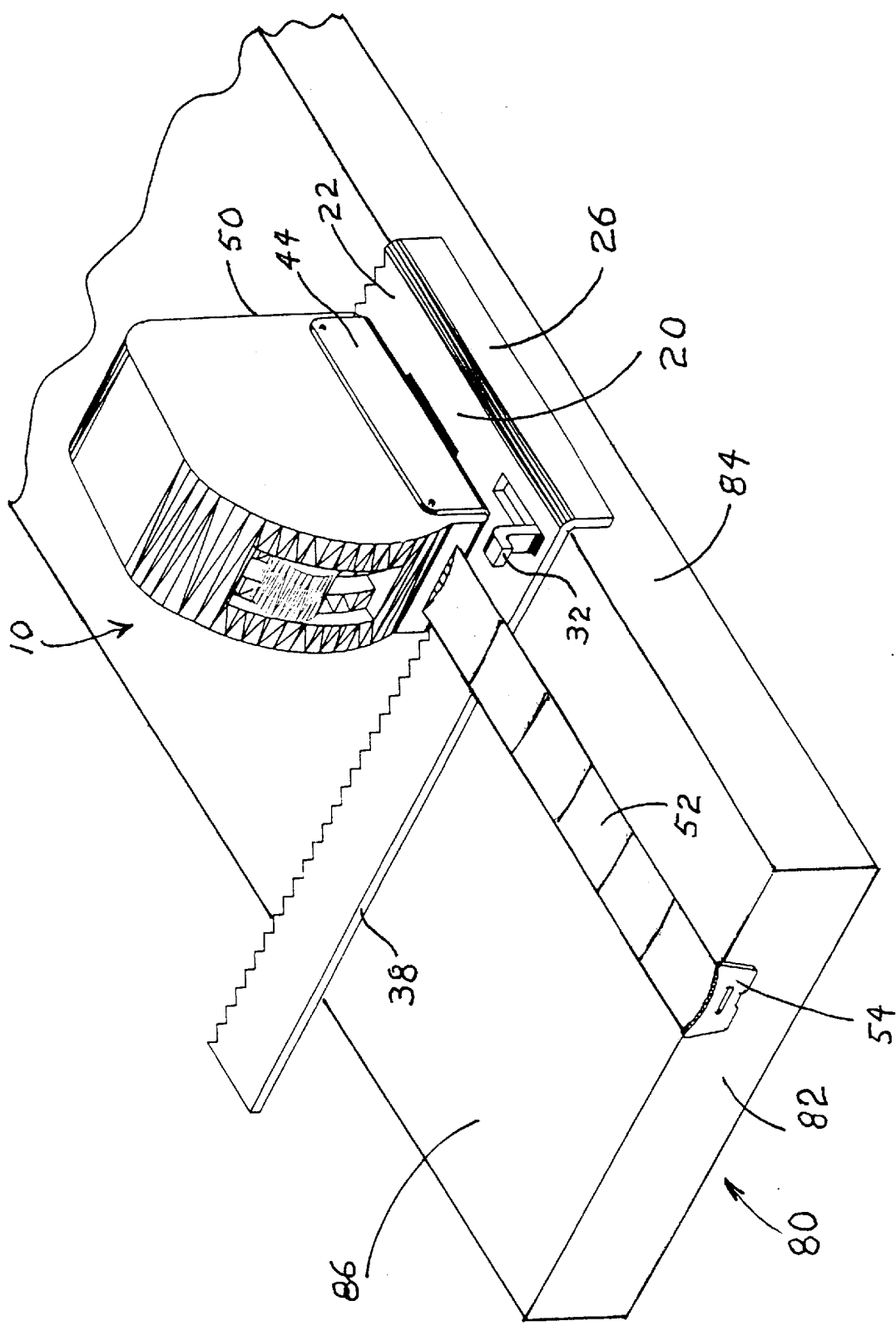

COMBINATION SQUARE AND TAPE MEASURE FOR USE WITH A TOOL BELT

BACKGROUND

Construction work and metal fabrication work typically involve the measuring and marking of work pieces for cutting or layout operations. Typically a carpenter or metal worker will employ the use of a measuring tape to first make a mark along the longitudinal edge of a work piece at a desired length. Once the carpenter or metal worker has made the desired mark he or she then requires the use of a combination square or carpenters square to extend the mark transversely across the work piece. This process which includes two distinct steps and two separate tools requires the carpenter or metal worker to maintain a knowledge of the whereabouts of these tools at all times which may be difficult in a large or cluttered work environment.

A common construction process in the framing of a house is the process of marking off stud spacing lines on top and bottom plates of the building subframe. The carpenter employed in this duty can be using the tape measure and square repeatedly for a number of days. If this person is working in a large or cluttered work environment the simple process of marking dimensions on work pieces can become inefficient if the carpenter is not monitoring the location of these essential tools.

If the worker is working above ground level there are additional problems with using a tape measure and square to properly mark off layout or cutting dimensions on work pieces. The carpenter working above ground in a building structure typically has few places to store tools where the tools will be easily accessible. Furthermore, simple layout steps become arduous when a worker is above ground. The inefficient process of using a first tool to make a mark and subsequently a second tool to extend that mark is even more problematic above ground.

Several tools have been designed to address the need for a single tool that can be used to mark off a longitudinal dimension on a work piece and allow the user of the tool to immediately extend this mark transversely across the work piece. These previous designs typically attach a tape measure to a square and have been successful at combining the measuring and marking operation into a single operation. The user of these tools benefits from the increased efficiency of not having to initially make marks on a work piece and then go back in a second operation with a square to mark the necessary transverse lines that are required.

An inherent problem with the existing combination tape measure and square tools has been the inability of the user to store the tool on a typical tool belt. Carpenters tool belts usually include a pouch that will accommodate a tape measure as well as a smaller open bottom pouch or sleeve that will retain the blade of a square. Existing tools that combine the tape measure and square are unable to be accommodated by a typical tool belt and must be stored within a tool box making the tools much less accessible. Furthermore, these existing tools are unable to provide the benefits for which they were designed to a carpenter working above ground. Working above ground, for example within the rafters of a house under construction, requires the carpenter to accommodate all the tools required with his or her tool belt. In this instance, existing combination measuring tape and square tools cannot be used even though the demands of measuring and marking in this above ground environment would make this a most valuable tool.

An additional deficiency with existing combination tape measure and square tools has been the inability of these tools to allow the user to mark off longitudinal layout lines or rip cutting lines on a work piece. A user of these tools would necessarily have to make a series of marks on a work piece and then with the use of long straight edge connect the marks into a longitudinal line. This two step process adds a degree of inefficiency to a simple task and requires the user to maintain contact with additional tools which can be difficult in a large or cluttered work environment.

For the forgoing reasons there is need for a tool that integrates the measuring capability of a tape measure with the marking capability of a square. There is additionally a need for this tool to be easily accommodated by a typical carpenters tool belt. There is a further need for a tool that allows a carpenter to quickly make longitudinal marks on a work piece for layout or rip cutting purposes. There is a need for a tool that provides these benefits to be simple in use, efficient and reliable in operation, and inexpensive to manufacture.

SUMMARY

The present invention satisfies all of the aforementioned needs of a tool combining the capabilities of a measuring tape and a square.

The combination square and tape measure of the present invention comprises a square having first and second legs arranged perpendicular to each other and a tape measure including a housing encasing a flexible measuring tape. Mounting means attach the tape measure to one leg of the square. The mounting means supports the tape measure for pivotable movement about the square; wherein the tape measure may be rotated about the square from at least a reclined position where a plane bisecting the housing of the tape measure is parallel to the plane of the square to a fully inclined upright position where the plane bisecting the tape measure is orthogonal the plane of the square. The mounting means maintains the outer surface of the tape measure at an elevated spaced apart position relative to the plane of the square when the tape measure is maintained in the reclined position. The gap created by the spaced apart position provides room for the thick material utilized for the pouches of the tool belt to be disposed between the tape measure and the square. This allows either the tape measure or square to be retained properly within a tool belt while allowing both the tape measure and the square to hang from the tool belt in an out of the way vertical orientation.

The square typically additionally includes stop means to support the tape measure in an orthogonal position and also may typically include a guide flange disposed on an outside edge of the first leg perpendicularly thereto. In a first preferred version of the invention, the mounting means typically comprises a mounting loop disposed on the square and a mounting clip disposed on the tape measure for releasable attachment to the mounting loop. In a second preferred version the mounting means comprises a hinge and is disposed proximate to an inside edge of the first leg. The combination square and tape measure of the present invention further typically includes a plurality of marking instrument receiving indentations disposed along at least one edge of the second leg, wherein the marking instrument receiving indentations are disposed at specific measurement intervals.

The combination square and tape measure may further include an indicator tab disposed on the square, wherein the leading edge of the tab is elevated from the surface of the square and is aligned with an edge of the second arm of the square, and wherein the tab is elevated above the square to a height to correspond to the height of a measuring tape extending from the housing of the tape measure.

The present invention provides benefits heretofore unrealized by previous tools combining a tape measure with a square. The present invention incorporates a tape measure and a square into a single tool that allows either element of the tool to be used without interference from the other element. In a first preferred version of the invention, the tape measure is in releasable attachment to the square. In this version the tape measure may be readily removed from the square allowing either tool to be used independently.

An additional benefit of the present invention is the ability of a carpenter or metal worker to make accurate measurement marks along the longitudinal edge of a work piece with the use of the tape measure, as well as providing a square to extend the marks transversely across the work piece in one simple operation without having to manipulate or adjust the tool. The tool is useful in making cross cut lines across a work piece as well as making the proper stud position marks on top and bottom plates during framing. The tool enhances efficiency during construction work or metal fabrication work by providing a single tool that performs the often required task of measuring and marking off dimensions on a work piece in a single step.

An additional benefit of the present invention combination square and tape measure is the ability to be accommodated by existing carpenters tool belts. The combination square and tape measure maintains the tape measure and square in a spaced apart relation when the tape measure is in a reclined position. A gap separating the tape measure and the square is sufficient to accommodate the thick material of a tool pouch. The pouch material is able to be maintained between the tape measure and the square while either one is retained in its proper pouch of the tool belt. The gap further insures that which ever element is not held in a pouch will hang in an out of the way vertical orientation while the other element is held in a pouch.

The combination square and tape measure of the present invention further typically includes a plurality of marking instrument receiving indentations disposed along at least one edge of the square. The marking instrument receiving indentations are typically disposed at specific measurement intervals. This feature provides the additional benefit of allowing the user to make longitudinal marks, such as rip cutting marks or layout marks, on a work piece in one operation. The user merely needs to maintain a marking instrument, such as a pencil, in the proper indentation and advance the square down the work piece while maintaining the guide flange in contact with the longitudinal edge of the work piece. This feature eliminates the need to use a long straight edge to connect marks previously made on a work piece to create a longitudinal mark.

The combination square and tape measure of the present invention provides the additional benefits of being simple and practical in use, efficient and reliable in operation, and inexpensive to manufacture. These and other benefits of the present invention will become apparent upon inspection of the accompanying specification, claims, and drawings.

DRAWINGS

FIG. 1*a* shows a first version of the combination square and tape measure of the present invention placed on a work piece.

FIG. 1*b* shows the first version of the combination square and tape measure with a marking instrument making a transverse mark on the work piece.

FIG. 1*c* shows the first version of the combination square and tape measure with a marking instrument making a longitudinal mark on the work piece.

FIG. 4 further shows the gap that is maintained between the tape measure and the square when the tape measure is fully reclined.

FIG. 5 further shows the square rotated slightly to expose the pouch.

DESCRIPTION

Figure 1B:
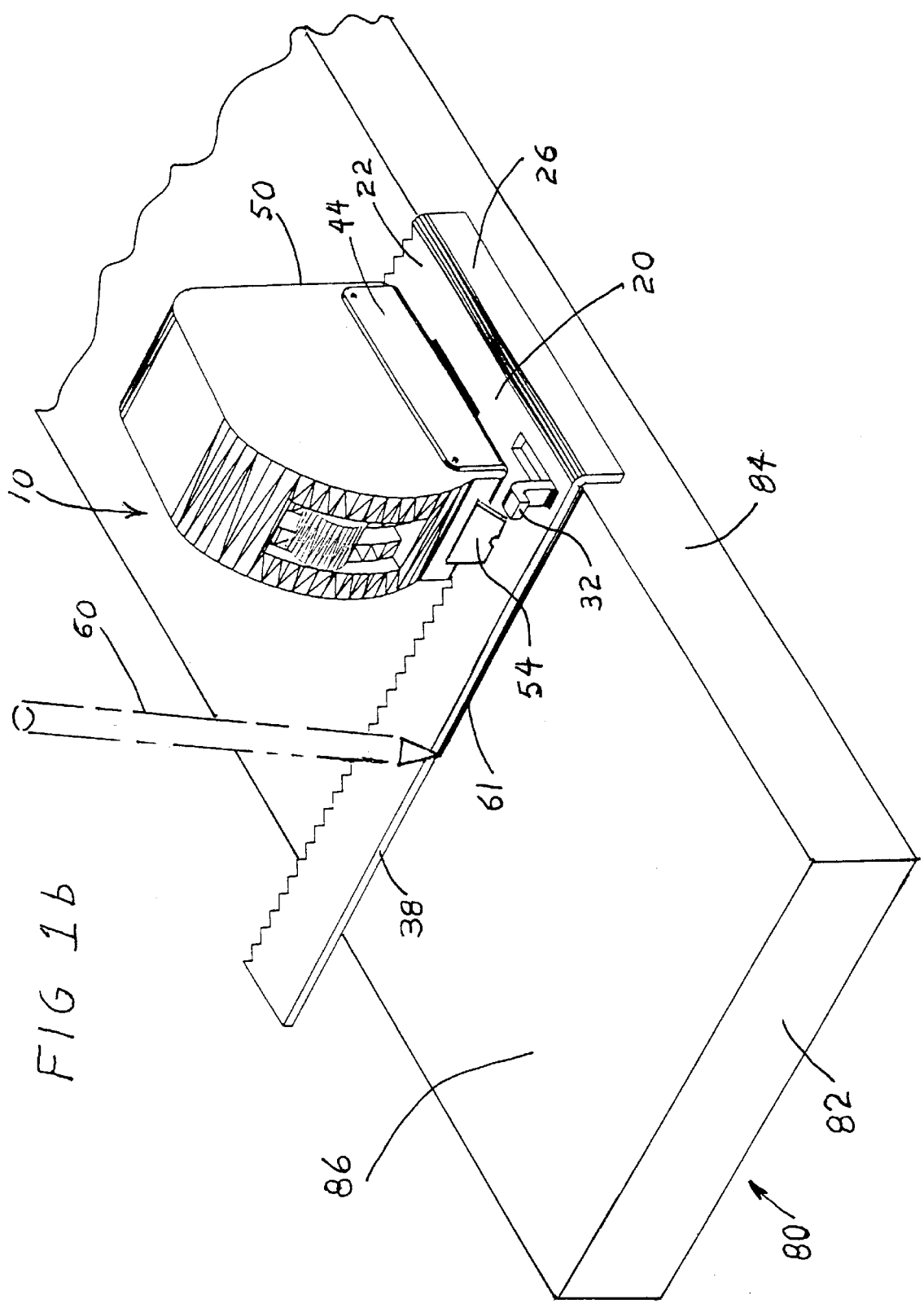
Figure 1C:
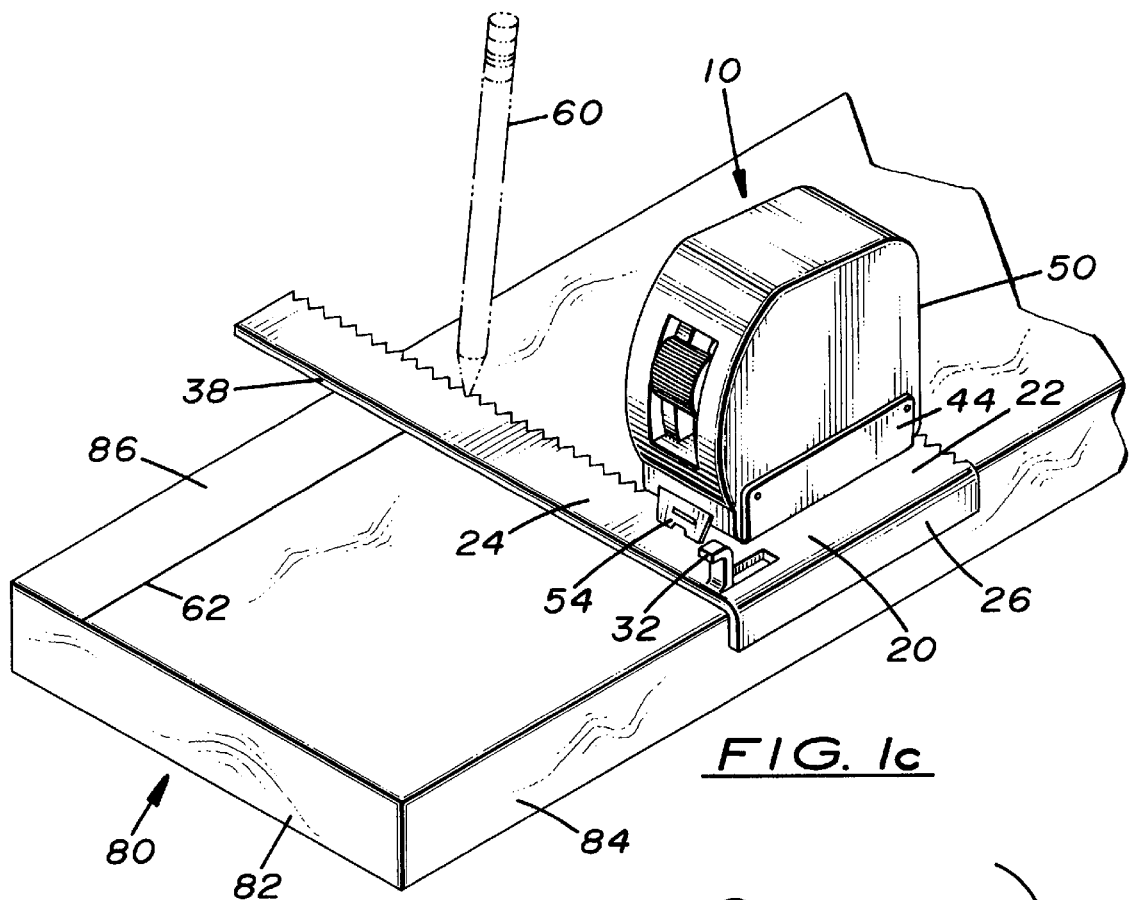

Referring to the drawings, FIGS. 1*a,* 1*b,* and 1*c* show a first version of the combination square and tape measure 10. The combination square and tape measure 10 includes a square 20 and a tape measure 50 attached to the square. The tape measure which is pivotally mounted to the square is shown in a fully inclined upright position in relation to the square. The combination square and tape measure is shown positioned on a work piece 80. FIGS. 1*b* and 1*c* further show a marking instrument 60 which is a pencil.

Figure 2:
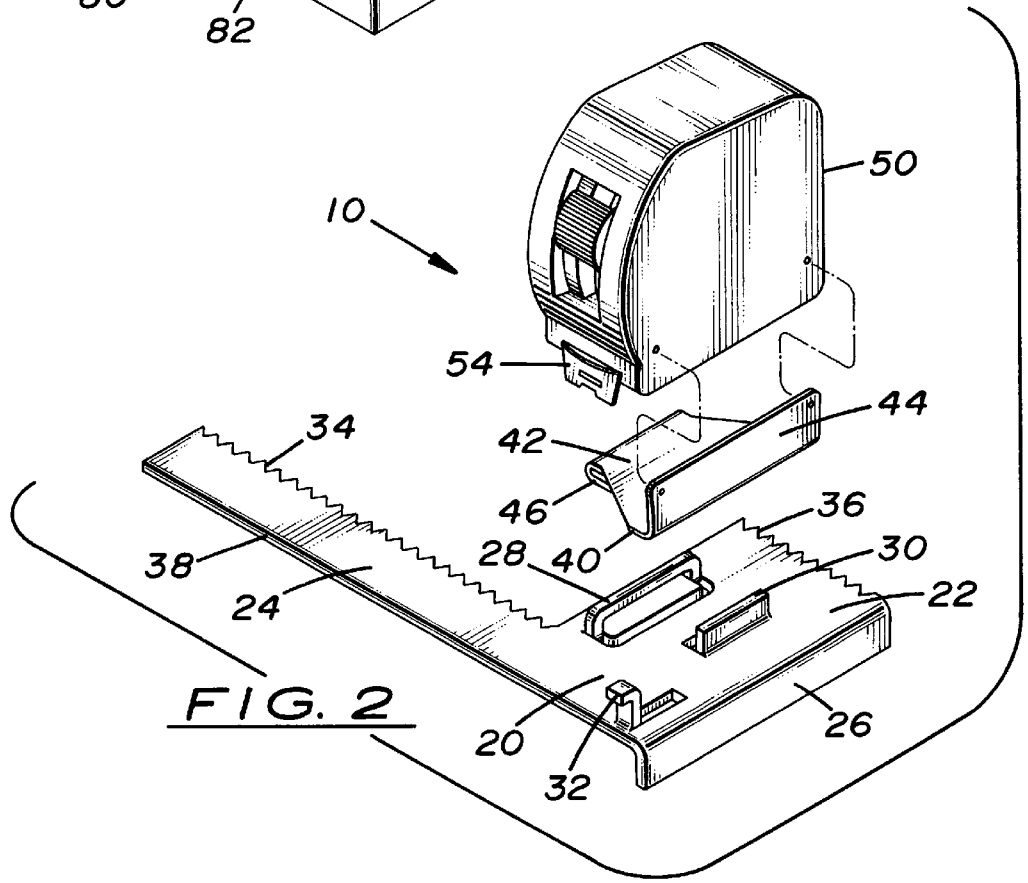
FIG. 2 shows an exploded view of the first version of the present invention.
Figure 3:
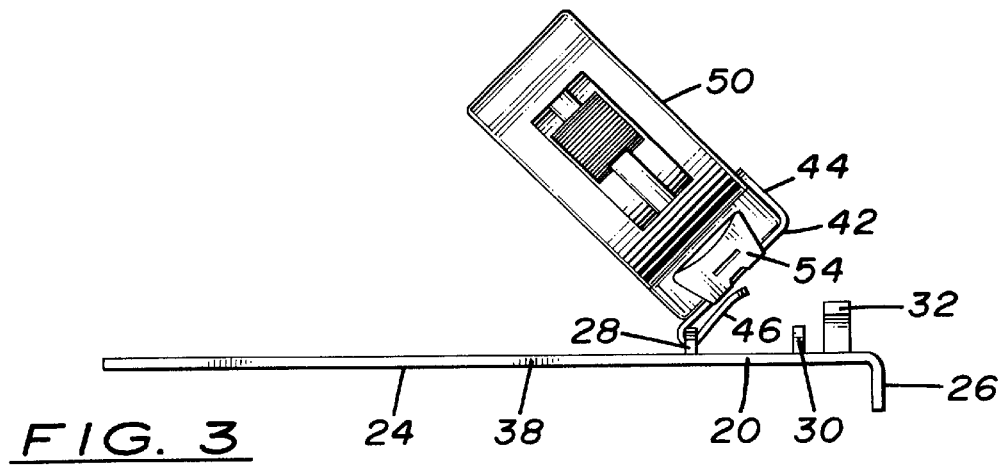
FIG. 3 is a side view of the first version of the present invention showing the tape measure partially rotated between a reclined position and a fully upright inclined position.

FIG. 2 shows an exploded view of the first version of the combination square and tape measure 10. This figure shows a mounting means comprising a mounting clip 40 which forms the pivoting attachment for releasably mounting the tape measure 50 to the square 20. FIG. 3 is a side view showing the first version of the combination square and tape measure. In this figure, the tape measure is shown partially rotated about the square in a position approximately half way between a fully inclined upright position and a fully reclined position.

Figure 4:
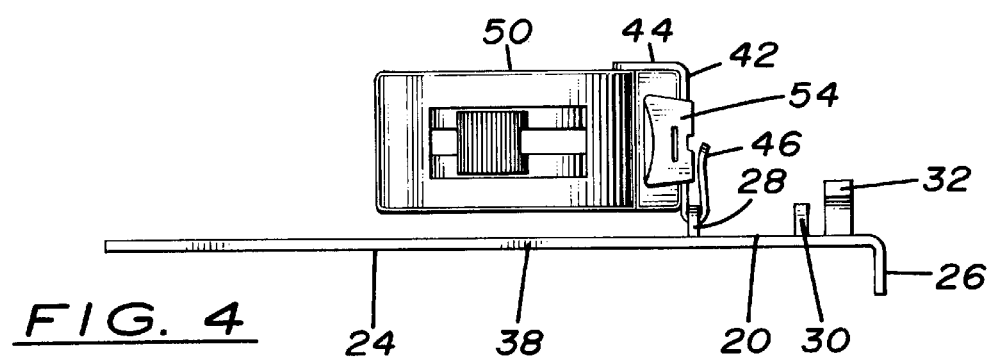
FIG. 4 is a side view of the first version of the present invention showing the tape measure in a fully relined position.
Figure 5:
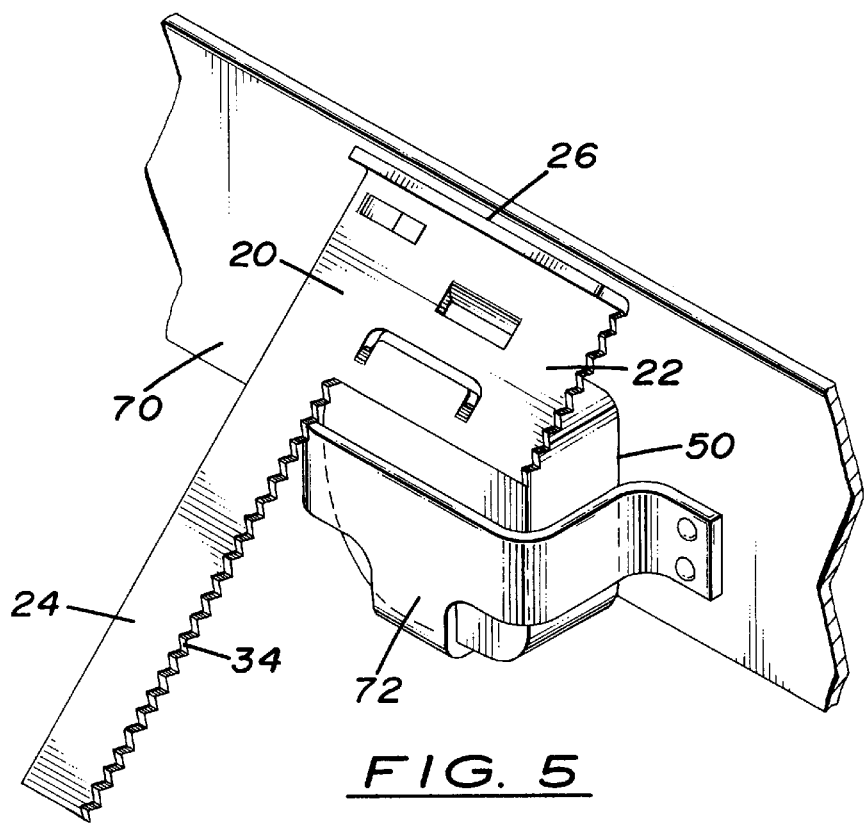
FIG. 5 shows the first version of the present invention with the tape measure disposed within the pouch of a tool belt.
Figure 6:
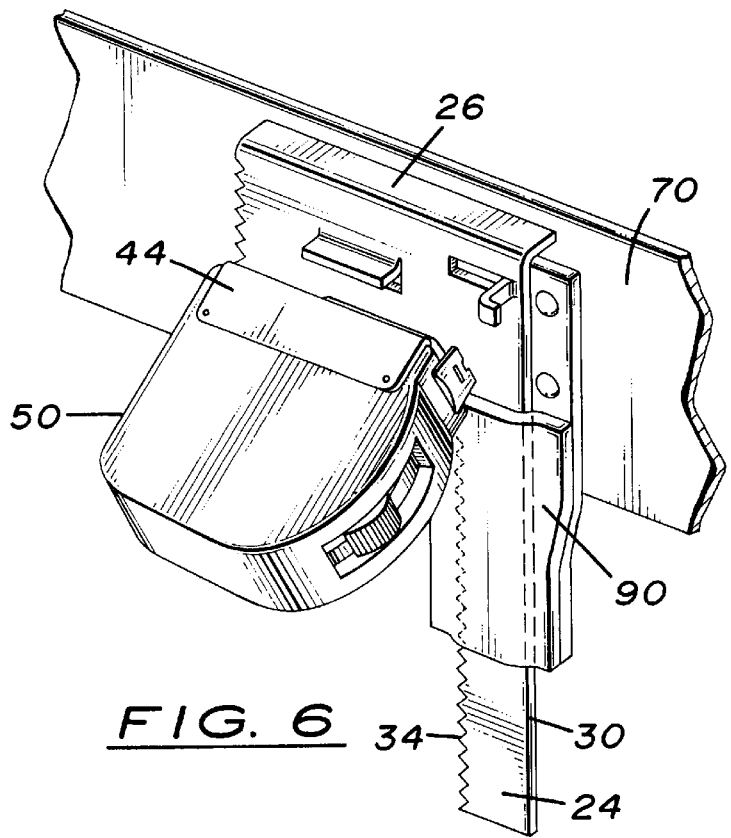
FIG. 6 shows the first version of the present invention with a leg of the square disposed within a sleeve of the tool belt. The tape measure has been rotated slightly to expose the sleeve.

FIG. 4 is a side view of the first version of the combination square and tape measure and shows the tape measure in a fully reclined position. FIG. 4 further shows the gap maintained between the tape measure 50 and the square 20 when the tape measure is fully reclined. FIG. 5 shows the first version of the combination square and tape measure with the tape measure disposed within the pouch 80 of the tool belt 70. FIG. 5 further shows the square 20 rotated slightly outwardly from the tape measure 50 for the purposes of exposing the pouch 80. FIG. 6 shows the first version of the combination square and tape measure with leg 24 of square 20 disposed within a sleeve 90 of the tool belt 70. In this figure, the tape measure is rotated slightly outwardly for the purposes of exposing the retention of the square 20 within the sleeve 90.

Figure 7:
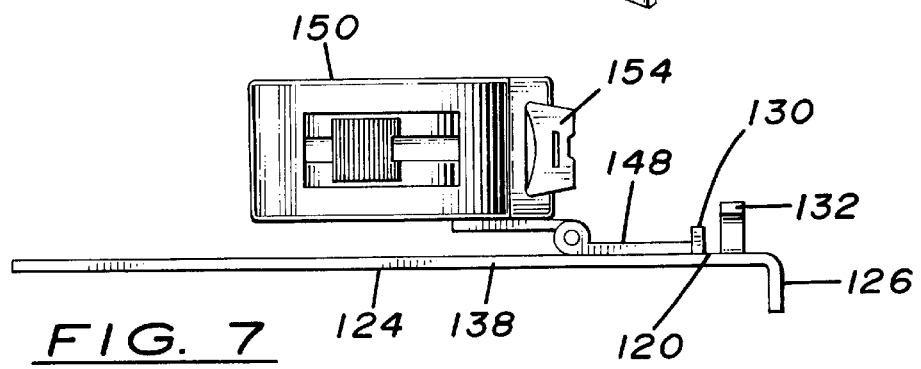
FIG. 7 shows a second version of the present invention with the tape measure in a fully reclined position.
Figure 8:
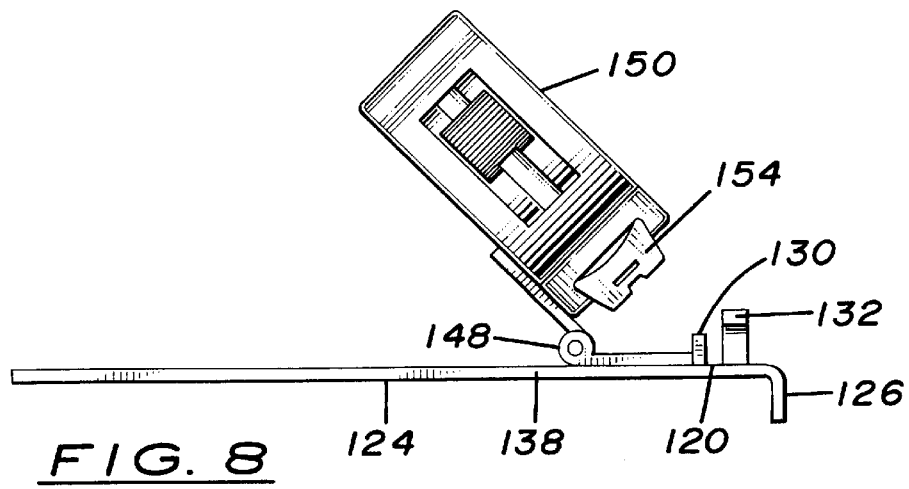
FIG. 8 shows a second version of the present invention with the tape measure partially rotated between a reclined and a upright position.

FIGS. 7 and 8 show a second version of the combination square and tape measure that utilizes a hinge 148 as the mounting means for pivotally mounting the tape measure 150 on the square 120. FIG. 7 shows the tape measure 150 partially rotated about the square 120. FIG. 8 shows the tape measure 150 rotated about the square 120 to a fully reclined position. FIG. 8 additionally shows that the necessary gap to accommodate the thick material used in tool belts is maintained between the tape measure 150 and the square 120 when a hinge 148 comprises the mounting means.

In greater detail, FIG. 1a shows the first version of the combination square and tape measure 10 positioned on a work piece 80. The tape measure 50 includes a flexible measuring tape 52 which is shown extended from the tape measure housing along the top surface 86 of the work piece 80 to the front edge 82 of the work piece 80. The flexible measuring tape 52 includes a tab 54 which is shown engaged on the front edge 82 of the work piece 80.

The square 20, which is typically metal, includes a first leg 22, to which tape measure 50 is pivotally mounted, as well as a second leg 24 that is attached to the first leg and is perpendicular thereto. The outside edge of the first leg 22 includes a guide flange 26 that extends orthogonally away from the top surface of the square 20. Guide flange 26 provides an abutment surface for squaring the combination square and tape measure 10 in relation to a work piece 80. In FIG. 1a the guide flange is shown abutted to a side edge of work piece 80.

FIG. 1a additionally shows an indicator tab 32 extending vertically from the top surface of square 20. The leading edge of the tab is elevated from the top surface of the square 20 and is aligned with the front edge 38 of the second leg 24 of the square 20. The tab 32 extends vertically from the square to a height where the height of the leading edge of the tab corresponds to the height of the flexible measuring tape 52 extending from the housing of the tape measure 50. The indicator tab allows the user to accurately transfer a measurement from the tape to the front edge 38 of the square without imparting an error from misreading the measurement due to the height of the flexible measuring tape above the square.

FIG. 1b shows a marking instrument 60 making a transverse mark 61 across the work piece.

FIG. 1c additionally shows a marking instrument 60 held within a marking instrument indentation 34 that are disposed on the back edge of the square second leg 24. Similar indentations are also typically disposed on the back edge of the first leg. This figure also shows a longitudinal mark 62 made by marking instrument 60.

FIG. 2 shows the mounting means utilized to pivotally support the tape measure 50 on the square 20 in greater detail. This exploded view shows a mounting loop 28 disposed proximate to the inside edge of the first leg 22 of the square 20. Additionally shown is a stop means comprising an upstanding wall 30 that supports the tape measure 50 when the tape measure has been rotated to a fully inclined upright position with respect to the square 20. FIG. 2 also shows the indicator tab 32. The mounting loop 28, upstanding wall comprising the stop means 30, and indicator tab 32, all typically would be formed on the metal square by stamping. Should the square be constructed of plastic, the elements 28, 30, and 32 would be integrally moulded into the square.

Also shown in FIG. 2 is the mounting clip 40. Mounting clip 40 includes a first section 42 and a second section 46 which is typically an extension of the first section. Second section 46 in this figure is an extension of the first section 42 which has been bent back onto the first section with a 180 degree bend. The first section 42 also typically includes an attachment surface 44 disposed on the first section of the mounting clip perpendicular thereto for attaching the clip to a tape measure. This attachment would typically include the use of fasteners (not shown). The entire mounting clip would typically be manufactured from light gauge spring steel allowing the second section of the clip to spring back onto the first section after the second section has been disposed under the mounting loop 28. In an alternative embodiment of the present invention the mounting clip could be integrated into the tape measure housing and be integrally molded therewith.

FIG. 3 shows in greater detail how the mounting means support the tape measure for pivotable movement about the square. In this figure the mounting clip is secured to the tape measure with the bottom surface of the tape measure in contact with the first section of the mounting clip. The mounting clip second section 46 has been slipped under the mounting loop 28 with the loop disposed within the 180 degree bend of the mounting clip. Once in this position, the tape measure may pivot freely about the square 20. FIG. 3 additionally shows the stop means which is an upstanding wall 30 which supports the tape measure once the tape measure has been rotated to a fully inclined upright position.

FIG. 4 shows the tape measure 50 rotated about the square 20 to a fully reclined position. In this position the tape measure is separated from the square 20 by a gap. This gap is caused by the elevated position of the mounting loop 28 in relation to the top surface of the square. The gap is necessary to allow thick materials such as leather and canvas utilized in tool belts to fit between the tape measure and the square. The provision of this gap permits the user of the combination square and tape measure to be properly retained within a tool belt while allowing both the tape measure and the square to hang from the tool belt in an out of the way vertical orientation.

FIG. 5 shows the tape measure retained within pouch 80 of the tool belt 70. The square 20 in this figure has been rotated outward from the vertical out of the way orientation to expose the pouch 80. In use, the gap created between the square 20 and the tape measure would allow the square to hang vertically from the belt in a non-obstructive manner.

FIG. 6 shows the second leg 24 of the square 20 retained within a tool belt sleeve 90. In this figure the tape measure has been rotated slightly outwardly for the purposes of exposing the retention of the square within the tool belt sleeve 90. In use, the gap would again allow the tape measure to hang in an out of the way vertical orientation.

FIGS. 7 and 8 show a second version of the combination square and tape measure. In this version of the tool the mounting clip and mounting loop have been replaced with a hinge 148. This particular hinge 148 has offset sections which elevates the tape measure from the surface of the square. As shown in FIG. 8, this arrangement also provides the necessary gap between the tape measure and the square to accommodate the thick material utilized in the construction of the pouches of tool belts to be disposed between the tape measure and the square. The hinge 148 occupies the same general mounting position as the mounting loop of the first version of the invention. The hinge in alternative versions of the invention could allow detachment of the tape from the square or have a locking mechanism to maintain the tape measure in the fully upright inclined position.

The combination square and tape measure is a simple efficient tool to use. The combination square and tape measure additionally offers many benefits to carpenters and others who measure and mark work for cutting or layout purposes.

As has been previously described, the combination square and tape measure of the present invention allows users to retain the tool within a tool belt in an out of the way manner. This feature allows someone working in a large or cluttered work area to avoid inefficiently spending time looking for this tool. By combining the square and tape measure in a single tool which is convenient to carry within a tool belt the user does not need to individually monitor the whereabouts of a tape measure and a square. When the user desires to use the combination square and tape measure the tool can be quickly removed from the tool belt.

The combination square and tape measure is able to assist in many measuring and marking tasks performed by carpenters, metal workers, and other craftsmen. To mark a work piece for cutting at a desired length the user would engage the tab 54 of the flexible measuring tape 52 on the end of a work piece as is shown in FIG. 1a. Once engaged the worker would advance the entire combination square and tape measure along the work piece until the desired length is shown on the tape. This measurement is read at the point on the flexible measuring tape 52 that is immediately adjacent to the leading edge of the indicator tab 32. The indicator tab is aligned with the marking front edge of the square. The user is thus assured that a measurement observed at the indicator tab will be accurately transferred to the work piece when a corresponding mark is made on the work piece along the front edge 38 of the square.

Before extending this mark transversely across the work piece the user can quickly retract the tape 52 into the housing of the tape measure 50 and then ensure that the guide flange 26 is flush against the edge of the work piece. This guide allows the tool to be self aligning and ensures that the tool will not slip when a marking instrument is pressed against the front edge 38 of the square if a minimum amount of pressure is maintained. Making transverse marks on a work piece is necessary for cutting a work piece to length or to make layout marks such as marking the proper stud locations on top and bottom framing plates. The tool allows the user to make these marks in a simple one step operation that guaranties accuracy. FIG. 1b shows a transverse mark 61 made by marking instrument 60.

The combination square and tape measure of the present invention also allows the user to easily make longitudinal marks on a work piece. The square includes marking instrument indentations disposed at specific intervals (typically a sixteenth of an inch or an eighth inch) along the back edge of the first and second legs of the square. To make a longitudinal mark on a work piece the user merely needs to place a pencil 60 or other marking instrument in the indentation corresponding to the desired distance from the edge of the work piece and advance the tool along the length of the work piece while maintaining the guide flange in abutment with the edge of the work piece. Such a mark is shown at 62 on FIG. 1. The tool eliminates the use of long unwieldy straight edges or chalk lines by allowing longitudinal marking to be done in one simple operation. This feature would be useful in many layout operations as well as marking a work piece for cutting.

As described, the combination square and tape measure of the present invention is simple and practical in use, efficient and reliable in operation, and inexpensive to manufacture. The square and mounting clip would typically be stamped from high quality metals but could be produced with other materials such as high strength plastics or composite materials. The tape measure could include an integral clip or could be a commonly available tape measure that allows for the attachment of a mounting clip or hinge.

It is understood that various modifications and changes in form or detail could readily be made without departing from the spirit of the invention. It is therefore intended that the invention be not limited to the exact form and detail shown and described, nor to anything less than the whole of the invention herein described and as hereinafter claimed.

We claim:

1. A combination square and tape measure comprising:

a square having first and second legs arranged perpendicular to each other;

a tape measure including a housing encasing a flexible measuring tape;

mounting means attaching the tape measure to one leg of the square; wherein the mounting means supports the tape measure for pivotable movement about the square; wherein the tape measure may be rotated about the square from at least a reclined position where a plane bisecting the housing of the tape measure is parallel to the plane of the square to a fully inclined upright position where the plane bisecting the tape measure is orthogonal the plane of the square;

and, wherein the mounting means maintains the outer surface of the tape measure at an elevated spaced apart position relative to the plane of the square when the tape measure is maintained in the reclined position.

2. The combination square and tape measure of claim 1, wherein the mounting means comprises:

a mounting loop disposed on the square, wherein the mounting loop is disposed in an elevated position relative to the square; and a mounting clip disposed on the tape measure for releasable attachment with the mounting loop.

3. The combination square and tape measure of claim 2, wherein the mounting clip comprises at least first and second sections, and wherein the first and second sections are attached by an approximately 180 degree bend; and wherein the first and second sections are separated by a loop receiving gap proximate to the 180 degree bend.

4. The combination square and tape measure of claim 3, wherein the mounting clip further comprises an attachment surface disposed on the first section of the mounting clip perpendicular thereto for attaching the clip to a tape measure.

5. The combination square and tape measure of claim 1, wherein the mounting means comprises a hinge.

6. The combination square and tape measure of claim 1, wherein the square additionally includes stop means to support the tape measure in a fully inclined upright position.

7. The combination square and tape measure of claim 1, wherein the square additionally includes a guide flange disposed on an outside edge of the first leg perpendicularly thereto.

8. The combination square and tape measure of claim 1, wherein mounting means is disposed proximate to an inside edge of the first leg.

9. The combination square and tape measure of claim 1, further including a plurality of marking instrument receiving indentations disposed along at least one edge of the second leg; wherein the marking instrument receiving indentations are disposed at specific measurement intervals.

10. The combination square and tape measure of claim 1, further including an indicator tab disposed on the square, wherein the leading edge of the tab is elevated from the surface of the square and is aligned with an edge of the second leg of the square, and wherein the tab extends vertically from the square to a height where the leading edge of the tab corresponds to the height of a measuring tape extending from the housing of the tape measure.

* * * * *